(12) United States Patent
Hill

(10) Patent No.: US 9,469,965 B2
(45) Date of Patent: Oct. 18, 2016

(54) HYDRAULIC COUPLER WITH PIN RETENTION SYSTEM FOR COUPLING AN ATTACHMENT TO A WORK MACHINE

(76) Inventor: Ian Hill, Newry (GB)

( * ) Notice: Subject to any disclaimer, the term of this patent is extended or adjusted under 35 U.S.C. 154(b) by 1050 days.

(21) Appl. No.: 13/497,377

(22) PCT Filed: Sep. 21, 2010

(86) PCT No.: PCT/EP2010/005770
§ 371 (c)(1),
(2), (4) Date: Mar. 21, 2012

(87) PCT Pub. No.: WO2011/035883
PCT Pub. Date: Mar. 31, 2011

(65) Prior Publication Data
US 2012/0177472 A1    Jul. 12, 2012

(30) Foreign Application Priority Data

Sep. 22, 2009 (GB) .................................. 0916613.3
Mar. 31, 2010 (GB) .................................. 1005482.3
Jun. 18, 2010 (GB) .................................. 1010269.7

(51) Int. Cl.
*E02F 3/36* (2006.01)
*F16K 17/36* (2006.01)
*F16K 31/22* (2006.01)

(52) U.S. Cl.
CPC ............. *E02F 3/3618* (2013.01); *E02F 3/365* (2013.01); *E02F 3/3663* (2013.01); *F16K 17/366* (2013.01); *F16K 31/22* (2013.01)

(58) Field of Classification Search
CPC ...... E02F 3/365; E02F 3/3618; E02F 3/3663
See application file for complete search history.

(56) References Cited

U.S. PATENT DOCUMENTS

| 1,085,964 | A | 2/1914 | Briggs |
| 2,056,006 | A | 9/1936 | Hodgkins |
| 2,932,282 | A | 1/1945 | McKinley et al. |
| 2,366,587 | A | 4/1960 | Armington |
| 3,414,136 | A | 12/1968 | Moore et al. |
| 3,940,931 | A | 3/1976 | Renfro et al. |

(Continued)

FOREIGN PATENT DOCUMENTS

| FR | 978531 | 4/1951 |
| FR | 1146273 | 11/1957 |

(Continued)

OTHER PUBLICATIONS

International Search Report and Written Opinion for PCT Application PCT/EP2010/005770 completed Dec. 15, 2010.

*Primary Examiner* — Scott Lowe
(74) *Attorney, Agent, or Firm* — Gardner, Linn, Burkhart & Flory, LLP

(57) ABSTRACT

A coupler for coupling an attachment to an excavator having a latching member for retaining a rear pin of the attachment and a blocking member for retaining the front pin of the attachment. A hydraulic actuator and spring are provided for holding the latching and blocking members in their closed states. In the event of a failure of the actuator, the spring, the latching member and the blocking member together hold the front and rear pins in their respective recesses to allow continued operation of the coupler, while allowing the pins to move with respect to the coupler to create a rattling movement that can indicate to the operator that a failure has occurred.

23 Claims, 10 Drawing Sheets

(56) References Cited

U.S. PATENT DOCUMENTS

| | | |
|---|---|---|
| 4,577,885 A | 3/1986 | Breu |
| 4,748,570 A | 5/1988 | Shochi et al. |
| 5,239,919 A | 8/1993 | Maki et al. |
| 5,355,676 A | 10/1994 | Inokuchi |
| 5,423,625 A | 6/1995 | Gebauer et al. |
| 5,617,771 A | 4/1997 | Landrum |
| 5,748,077 A | 5/1998 | Brandt |
| 6,132,131 A | 10/2000 | Nakamura et al. |
| 6,173,572 B1 | 1/2001 | Cobo et al. |
| 6,273,128 B1 | 8/2001 | Paczonay |
| 6,286,412 B1 | 9/2001 | Manring et al. |
| 6,295,810 B1 | 10/2001 | Langen et al. |
| 6,332,747 B1 | 12/2001 | Lee |
| 6,379,075 B1 | 4/2002 | Shamblin et al. |
| 6,422,805 B1 | 7/2002 | Miller |
| 6,481,124 B1 | 11/2002 | Miller et al. |
| 6,579,263 B1 | 6/2003 | Chernack |
| 6,902,346 B2 | 6/2005 | Steig, Jr. et al. |
| 7,018,159 B2 | 3/2006 | Jordan et al. |
| 7,047,866 B2 | 5/2006 | Fatemi et al. |
| 7,306,395 B2 | 12/2007 | Fatemi |
| 7,426,796 B2 | 9/2008 | Cunningham et al. |
| 7,493,712 B2 | 2/2009 | McCormick et al. |
| 7,549,243 B1 | 6/2009 | Gilles |
| 7,620,522 B2 | 11/2009 | Bredau et al. |
| 7,648,305 B2 | 1/2010 | Beales |
| 7,797,862 B2 | 9/2010 | Daraie et al. |
| 7,984,575 B2 | 7/2011 | Robl et al. |
| 7,984,576 B2 | 7/2011 | Miller et al. |
| 8,136,353 B2 | 3/2012 | Dybing |
| 2002/0071754 A1 | 6/2002 | Fatemi |
| 2003/0010198 A1 | 1/2003 | Fuss et al. |
| 2004/0255774 A1 | 12/2004 | Hill |
| 2005/0169703 A1 | 8/2005 | Fatemi |
| 2005/0214105 A1 | 9/2005 | Steig, Jr. et al. |
| 2007/0157492 A1 | 7/2007 | Miller et al. |
| 2007/0166143 A1 | 7/2007 | Hart et al. |
| 2007/0199214 A1 | 8/2007 | McCormick et al. |
| 2009/0282712 A1 | 11/2009 | Pruszynski |
| 2010/0061799 A1 | 3/2010 | Hill |
| 2010/0067982 A1 | 3/2010 | Hill |
| 2011/0088795 A1 | 4/2011 | Hill |
| 2011/0091267 A1 | 4/2011 | Hill |
| 2011/0243654 A1 | 10/2011 | Hill |

FOREIGN PATENT DOCUMENTS

| | | |
|---|---|---|
| FR | 2914932 A1 | 10/2008 |
| GB | 897384 | 5/1962 |
| GB | 1586621 | 3/1981 |
| GB | 2330570 A | 4/1999 |
| GB | 2332417 A | 6/1999 |
| GB | 2450127 A | 12/2008 |
| JP | 57155168 A | 9/1982 |
| KR | 2001 0019689 A | 3/2001 |
| NZ | 220 557 A | 2/1991 |
| WO | WO 98/40569 A1 | 9/1998 |
| WO | 2004/072387 A1 | 8/2004 |
| WO | WO 2005/026454 A1 | 3/2005 |
| WO | WO 2008/031590 A2 | 3/2008 |

HYDRAULIC COUPLER WITH PIN RETENTION SYSTEM FOR COUPLING AN ATTACHMENT TO A WORK MACHINE

CROSS REFERENCE TO RELATED APPLICATIONS

The present application claims the priority benefits of International Patent Application No. PCT/EP2010/005770, filed on Sep. 21, 2010, and also of Great Britain Application Nos. GB0916613.3, filed on Sep. 22, 2009, GB1005482.3, filed on Mar. 31, 2010, and GB1010269.7, filed on Jun. 18, 2010, which are hereby incorporated herein by reference in their entireties.

FIELD OF THE INVENTION

The present invention relates to couplers for coupling an attachment, such as an excavating bucket, to the arm of an excavator or other machine. The invention relates particularly to couplers that are powered, and to couplers that are capable of accommodating attachments with different pin spacings.

BACKGROUND TO THE INVENTION

Hydraulic couplers for quickly connecting and disconnecting construction attachments from excavating equipment are well known. A major problem with existing couplers is that a failure of the primary locking force, typically a hydraulic failure, can cause the attachment to swing or even completely detach from the coupler posing a safety hazard. Another problem is operator misuse or accidental operation of the coupler again leading to a safety hazard. Hydraulic failure can be particularly problematic in couplers that can accommodate attachments with different pin spacings since, depending on the pin spacing, there can be more scope for movement of pins with respect to the coupler in the event of a failure and this can increase the likelihood that the pins can escape.

It would be desirable to provide an improved coupler that is capable of retaining both pins of an attachment in the event of hydraulic failure as well as accommodating attachments with different pin spacings.

SUMMARY OF THE INVENTION

Accordingly, a first aspect of the invention provides a coupler for an excavator (or other apparatus, e.g. a back hoe), the coupler comprising a body having a first and second spaced-apart recesses for receiving respective pins of an attachment; a latching member movable into and out of a latching state in which it is capable of retaining the respective attachment pin in said first recess; actuating means for actuating said latching member into and out of said latching state; a blocking member movable into and out of a blocking state in which it is capable of retaining a respective attachment pin in said second recess; actuating means for actuating said blocking member into and out of said latching state; biasing means for resiliently biasing said latching member into its latching state; and biasing means for resiliently biasing said blocking member into its blocking state, wherein in said latching state and under the action of said actuating means, said latching member is arranged to engage with its respective attachment pin and to hold said pin in a first position in said respective recess, and wherein upon failure of said actuating means, said latching member is movable in an un-latching direction against the bias of said resilient biasing means, said latching member being shaped to define a pin-retaining portion arranged to receive said respective pin upon movement of said latching member in said un-latching direction, the arrangement being such that, in use, when said pin is in said pin-retaining portion, the bias of said resilient biasing means balances with the weight of the attachment acting on said latching member through said pin such that the latching member holds said pin in a second position in said respective recess.

Hence, the latching member is able to maintain a latching state in the event of a failure of the actuating means.

In particular embodiments, in the event of a failure of the actuating means and depending on the orientation of the coupler, the weight of the attachment is shared by one or more of the latching member, the blocking member and the coupler body (e.g. at said second recess), the action of the resilient biasing means balancing the respective force exerted on the latching member and/or blocking member, as applicable depending on coupler orientation, by the weight of the attachment via the respective attachment pin such that both the latching member and the blocking member are capable of retaining their respective attachment pins in the respective recess. This allows the attachment to being retained by the coupler in any orientation of the coupler.

Upon failure of said actuating means for actuating said latching member, the coupler is capable of adopting an equilibrium state in which said respective pin is in said pin-retaining portion and the biasing force of said resilient biasing means balances with the un-latching force caused by the weight of the attachment acting on said latching member through said respective pin to cause the latching member to hold said respective pin in a second position in said respective recess. Couplers embodying the invention are capable of adopting said equilibrium state in at least some orientations of the coupler, including when the coupler is substantially horizontal, and typically non-vertical orientations of the coupler. In some embodiments, the coupler may not be able to adopt said equilibrium state in substantially vertical orientations of the coupler. In a substantially vertical orientation where said second recess is above said first recess, the weight of the attachment bearing on said latching member is relatively small, allowing the resilient basing means to hold the latching member in its latching state. The shape and orientation of the second recess is such that the second recess is capable of retaining its attachment pin in said vertical orientation, for example the second recess may be hook shaped and oriented to open substantially upwardly when in said vertical orientation. In a substantially vertical orientation where said first recess is above said second recess, said blocking member, held in its blocking state by the action of said resilient biasing means, retains the respective attachment pin in said second recess. This helps to keep the other attachment pin in the first recess, although should said other pin escape, the blocking member retains the attachment on the coupler by retaining its respective pin. To this end, the blocking member is pivotably coupled to the body at a pivot point that is above said second recess when the coupler is in said vertical orientation such that the force caused by the weight of the attachment on said blocking member does not cause said blocking member to move to a non-blocking state. Still further, the internal profile of said blocking member is shaped such that the force caused by the weight of the attachment on said blocking member causes said blocking member to tend to move to the blocking state.

In typical embodiments, when, under the action of said actuating means, said latching member engages with its respective attachment pin to hold said pin in said first position in said respective recess, the other attachment pin is held in a first position in said second recess (typically in a seat in said second recess) by the action of said actuating means acting on said latching member in which first position said other attachment pin does not engage said blocking member, and wherein, upon failure of said actuating means acting on said latching member and movement of said latching member in said un-latching direction against the bias of said resilient biasing means, said other attachment pin moves to a second position in said second recess. In substantially vertical orientations of said coupler where said first recess is above said second recess, said other attachment pin engages with said blocking member in its blocking state (in which it substantially closes or at least partially closes the second recess to the extent that the pin cannot escape). Hence the blocking member retains its attachment pin in the event of a failure. This is facilitated by the action of the resilient biasing means acting on the blocking means and, preferably, by the shape of the internal profile of the blocking member.

The actuating means are typically power-operated, usually hydraulically operated. In preferred embodiments, the same actuating means is arranged to operate both the latching and blocking members. The actuating means conveniently comprises a linear actuator such as a ram. The actuator may therefore be coupled to both the latching member and the blocking member, either directly or indirectly via a linkage or one or more resiliently deformable members.

Typically, one end of the actuator is coupled to the latching member the other end being coupled to the blocking member. In one embodiment, the respective ends of the actuator are pivotably coupled to a respective one of the latching and blocking members. Alternatively, one end of the actuator is coupled to the latching member and the other end of the actuator is pivotably coupled to the body of the coupler. In this arrangement, the actuator is coupled to the blocking member such that pivoting movement of the actuator with respect to the body of the coupler as the actuator extends and/or retracts causes the blocking member to move into and/or out of its blocking state.

In particular embodiments, the same resilient biasing means is arranged to act on both the latching and blocking members. The resilient biasing means may comprise one or more springs, especially a compression spring, or other resilient biasing member such as a gas strut. Conveniently, the or each resilient biasing member is incorporated (either externally or internally) into the actuator, and may be arranged to urge the actuator into its extended state.

In particular embodiments, the latching member has a jaw portion whose internal profile has a primary pin-engaging surface, a free end and a recessed portion formed between the primary pin-engaging surface and the free end. The recessed portion is recessed with respect to the surface and preferably also with respect to the free end. The recessed portion is preferably wide enough to receive the pin. Ideally, the recessed portion is located substantially at the free end. The recessed portion is typically concave such that it defines a lip at the end closest to the free end.

Typical embodiments of the invention include a latching member for retaining the first (rear) pin in the first (rear) recess and a blocking member for retaining the second (front) pin in the second (front) recess. The recesses usually face in mutually perpendicular directions, the front recess being hook-like in shape and function. The latching member and blocking member typically each comprises a pivoted lever. Both members are arranged to retain the respective pin in the event of a loss or reduction of the force of the primary actuating mechanism (usually a hydraulic actuator). Advantageously, both members are biased into their respective latching/blocking states by the action of at least one resiliently biasing means, conveniently a spring, e.g. a compression spring. Conveniently, the same biasing means, e.g. the same spring, can be used to bias both latching members.

The first, or rear, latching member, and in particular its internal profile, is advantageously shaped such that any turning moment imparted to the latching member by the weight acting through the pin is overcome by the force applied to the latching member by the spring, or other resilient bias. This arrangement should hold irrespective of the pin spacing of the attachment. Typically, selecting a shape for the internal profile that achieves this aim for the shortest pin spacings that can be accommodated by the coupler ensures that the same effect is also achieved for wider pin spacings. Conveniently, this effect can be achieved by selecting the length of the rear latching member and or curvature of its internal profile such that the action of the spring, or other resilient bias, overcomes the turning moment imparted to the latching member by the weight acting through the pin before the pin falls off the end of the latching member. Hence the pin is retained by the latching member under the action of the spring, or other resilient bias. Conveniently, this is achieved by providing a concave portion in the internal profile for receiving the pin in the event of hydraulic failure. The concave portion preferably comprises said recessed portion of the internal profile. Typically the concave portion defines an upturned lip substantially at or adjacent the free end of the latching member.

As the attachment pin spacing increases so does the risk that the front (second) pin will escape from the front aperture (recess) before the rear (first) pin engages with the coupler body at the innermost end of its recess. To overcome this problem, in preferred embodiments forward (to the left as viewed in FIG. 1) movement of the front pin is prevented from causing the pin to escape its recess by the front blocking member, aided by the action of the spring, or other resilient bias, being substantial enough to withstand any forces that may be exerted by the front pin moving forwards. Even when the coupler adopts a non-horizontal orientation, the action of the spring, or other resilient bias, urges the front blocking member to its closed, or blocking, state. In addition, the internal profile of the front blocking member is advantageously shaped such that engagement of the front pin with the front blocking member urges the front blocking member into its blocking state. For example this can be achieved by making the internal profile of the front blocking member concave at or adjacent its free end. The blocking member may be located on the coupler such that it is visible to the machine operator (typically located in a cab) when in the blocking state to allow verification of its operation.

Thus, in a particular embodiment, through the provision of a front blocking member, combined with the addition of one or more springs for resiliently biasing both the blocking and latching members to their latching/blocking states, and a rear latching member that is shaped to retain its pin, both pins of the attachment can be retained when the primary hydraulic actuator fails.

In particular embodiments, the coupler is arranged such that, should a failure of the primary actuator occur, then an indication of this failure will be created, such as via a movement or rattle of the attachment with respect to the coupler. The clearance between the front pin and the front blocking member and also the shape of the rear latching member may combine to allow the shake or rattle of the attachment.

The opposite end of the actuator may be coupled either directly or indirectly to the front blocking member, which prevents the pin escaping from the front recess but takes no part in the normal intended operation of the coupler. Under normal conditions the front pin is biased against the rear face of the front recess by the action of the extended hydraulic actuator acting upon the rear attachment pin via the rear latching member. Should the extension force of the actuator be reduced for any reason the forces imposed upon the attachment during the normal coupler operation will allow the front attachment pin to move back and forwards within the front recess as the forces overcome the reduced extension force, and forces the rear latching member in a direction away from its latching position. Movement of the pins within their recesses results in a shake or rattle of the attachment, which will indicate to the machine operator that a failure has occurred.

The actuating mechanism in a preferred embodiment comprises a hydraulic actuator and may incorporate a gravity operated valve which requires that the actuator be in a certain orientation before retraction of the actuator is possible. The gravity operated valve may comprise a ball movable within a cavity under the influence of gravity such that passage of oil through the actuator to retract the actuator is prevented by the ball unless the coupler is in an orientation where gravity would tend to retain the attachment upon the coupler in the event that the retraction of the hydraulic actuator is attempted.

The front blocking member may be associated with a gravity-actuated positioner whose function is to prevent the retraction of the front blocking member by the hydraulic actuator in certain coupler orientations. To ensure that this gravity-actuated positioner is functional in the full dump (bucket fully open) position it may include a resiliently deformable member. This resiliently deformable member may be straight or curved or a combination of the two and is arranged in such a way that when the coupler is in the dump (bucket fully open) position it will actively bias the positioner into a position where it will prevent the retraction of the front blocking member via contact with the dipper arm of the machine.

Another aspect of the present invention provides a coupler for an excavator or other apparatus, the coupler comprising a body having a first and second spaced-apart recesses for receiving respective pins of an attachment; a latching member movable into and out of a latching state in which it is capable of retaining the respective attachment pin in said first recess; means for actuating said latching member into and out of said latching state; and optionally also a blocking member movable into and out of a blocking state in which it is capable of retaining a respective attachment pin in said second recess, wherein at least one of the latching or blocking members when in the latching/blocking state defines, or is movable to define, together with its respective recess, a station for said respective pin, said station being shaped and dimensioned to allow movement of said respective pin with respect to the coupler body, and wherein, in a first mode of use in which said latching member or blocking member adopts said latching state or blocking state, said respective pin is held under the action of said actuating means in a first position with respect to the body of the coupler, and in response to a failure or part failure of said actuating means, said respective pin is movable to said station.

When in said station, movement of the pin with respect to the coupler body creates a rattle that is detectable by the operator and may be interpreted as an indication of failure of the actuating means.

A respective one of said pin-receiving stations may be defined by each of said latching or blocking members when in the latching/blocking state together with its respective recess.

In particular embodiments, failure or part failure of said actuating means causes said latching member to move, conveniently in a direction towards its non-latching state (although while still maintaining its latching state), and said movement of said latching member allows the, or each, attachment pin, as applicable, to move into the respective station. In such cases, the respective attachment pin is held in its first position by the latching member/blocking member, said movement of the latching member creating the respective station for the pin. Advantageously, said latching member is shaped to define a recess, said recess in the latching member forming, together with the respective pin-receiving recess, said respective station upon said movement of the latching member.

In particular embodiments, the blocking member and its respective pin-receiving recess are arranged to define the respective station between the pin and the blocking member when the pin is in its first position. Upon failure or part failure of said actuating means (and, in a particular embodiment, upon said movement of the latching member) said pin is able to move into said station.

In particular embodiments, the actuating means comprises an actuator, especially a linear actuator such as a ram, coupled to said latching member and arranged to actuate said latching member into and out of its latching state. Conveniently, said actuator is connected to the latching member such that it acts directly thereon.

In particular embodiments, said actuator is also coupled to said blocking member and arranged to actuate said blocking member into and out of its blocking state. Typically, the actuator comprises a housing from which an actuating rod is extendable, one or other of the housing or rod being coupled to the latching member, the other of the housing or rod being coupled to the blocking member.

Alternatively, other means for actuating said blocking member into and out of said blocking state may be provided.

Advantageously, said actuator is provided with resilient biasing means arranged to urge said actuator into a state that corresponds with the latching state of the latching member (and in preferred embodiments also the blocking state of the blocking member). Typically, the actuator is arranged to hold said latching member in its latching state when in an extended state, and so the resilient biasing means is arranged to urge said actuator into its extended state. Conveniently, the resilient biasing means comprises a spring, for example a compression spring. Typically, the force exerted by the resilient biasing means is less than the force exerted by the actuator. Hence, failure of the actuator may allow movement of the latching member against the bias of the resilient biasing means.

In particular embodiments, at least one of the latching and blocking members are pivotable with respect to the body. Typically, at least one of the latching and blocking members comprises a hook.

Typical couplers embodying the invention provide a means of quickly attaching, retaining and detaching implements, e.g. excavating buckets, from excavators, including backhoes and similar excavating or digging equipment. Typically, the couplers include a body with two attachment points for the excavator, two recesses for receiving the attachment pins, front blocking member and rear latching member, usually in the form of hook shaped levers, and a powered actuator to move the latching and blocking members. The blocking and latching members, when in the respective blocking and latching states, retain the respective attachment pins in the front and rear recesses of the coupler respectively. The blocking member and latching member advantageously retain the respective pins substantially within their respective recess/aperture the event of loss of the main engagement force of the actuator.

In particular embodiments, means are provided for indicating via the normal use of a coupled attachment that a failure of the primary actuating mechanism within the coupler has occurred.

Further advantageous aspects of the invention will be apparent to a skilled person upon review of the following description of a preferred embodiment and with reference to the accompanying drawings.

BRIEF DESCRIPTION OF THE DRAWINGS

Embodiments of the invention are now described by way of example and with reference to the accompanying drawings in which like numerals are used to denote like parts and in which.

DETAILED DESCRIPTION OF THE DRAWINGS

Figure 8:
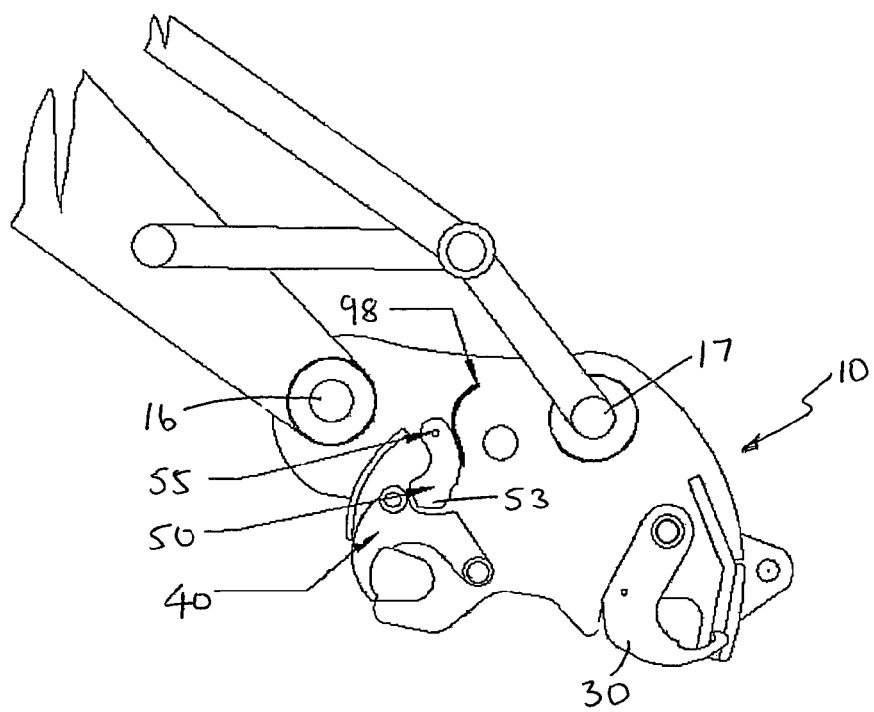
FIG. 8 is a side view of the coupler of FIG. 1 coupled to the arm of an excavator and in a horizontal working orientation.
Figure 9:
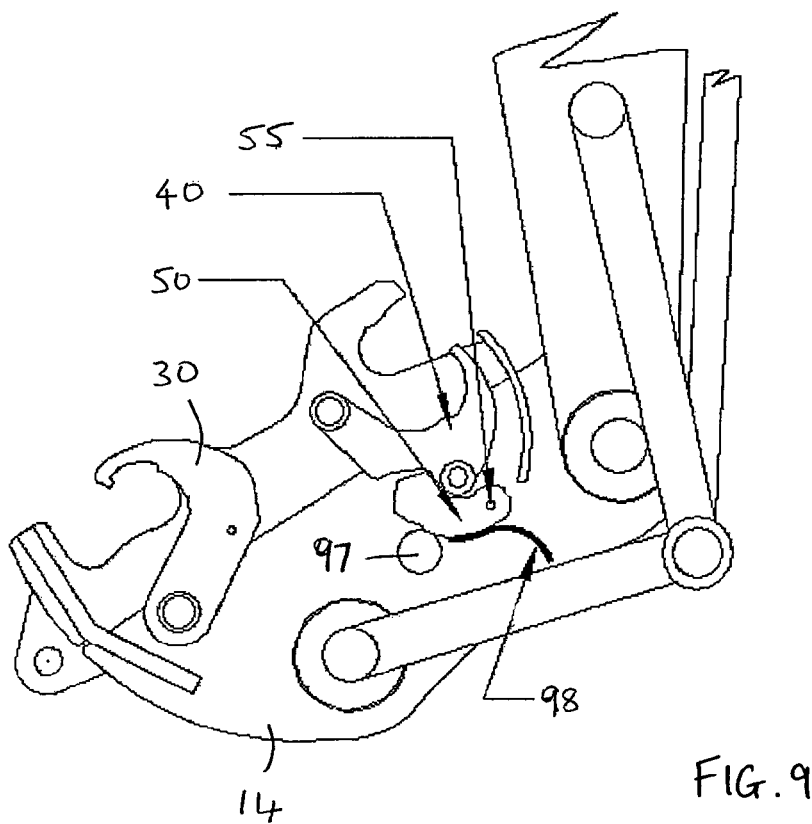
FIG. 9 is a side view of the coupler of FIG. 1 coupled to the arm of an excavator and in an inverted orientation.
Figure 10:
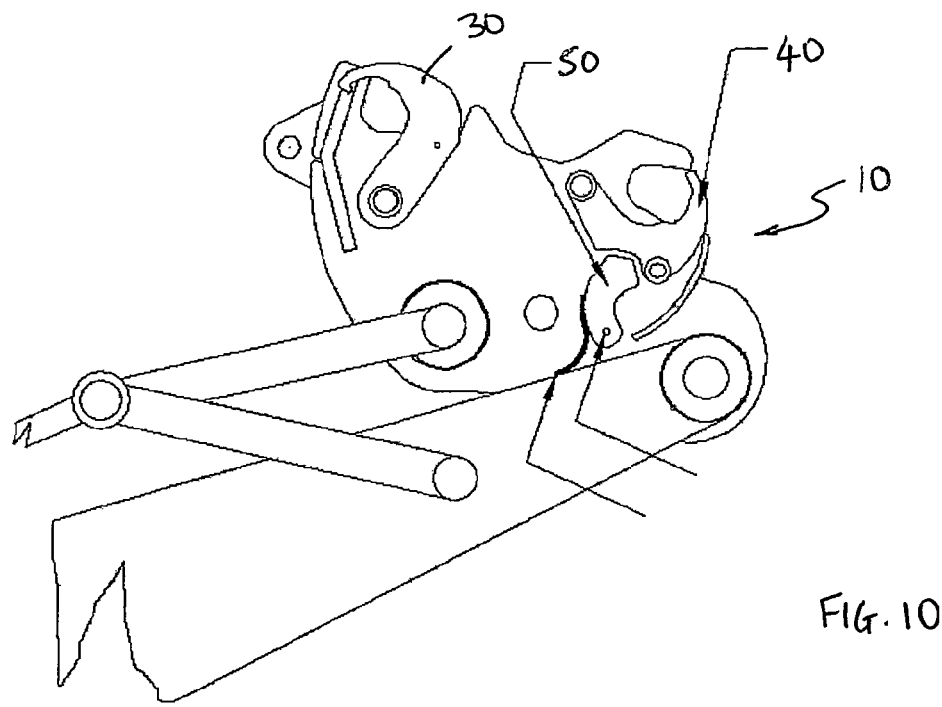
FIG. 10 is a side view of the coupler of FIG. 1 coupled to the arm of an excavator and in a full curl or dump orientation.

Referring now to FIGS. 1 to 13B of the drawings there is shown, generally indicated as 10, a coupler, or hitch, for connecting a tool, or other attachment such as a bucket or hammer, to an arm (shown in FIGS. 8 to 10) of an excavator (not shown), or other apparatus. The coupler 10 has a body 14 typically comprising two spaced-apart side plates 15 (only one shown). The body 14 is shaped to define pin-receiving apertures 16, 17 by which the coupler 10 may be connected to the end of the arm. Typically, there are two spaced-apart apertures 16, 17 in each of the two side plates 15, the apertures in one side plate being aligned with the apertures in the other. When connected, the coupler 10 is able to pivot with respect to the arm about the axis of the apertures 16. Usually, a hydraulic mechanism, or other power operated mechanism (not shown), is provided, typically in association with a mechanical linkage, to pivot the coupler 10 with respect to the arm. The mechanical linkage is usually connected between the arm and the aperture 17 (as may be seen by way of example in FIGS. 8 to 10).

The body 14 includes first and second pin-receiving recesses 20, 22 formed in each side plate 15. Each recess 20, 22 is shaped and dimensioned to receive a respective pin 26, 26', 26" of a bucket or other attachment. Normally, the recesses 20, 22 face in mutually perpendicular directions. The recess 20 is typically hook-like in shape and function. The recess 22 may be wider than is necessary to receive a single pin 26 in order to accommodate attachments with different pin spacings, as is illustrated by pins 26' and 26" which are intended to represent a respective pin of a respective attachment, the attachment of pin 26' having narrower pin spacings than the attachment of pin 26". Clearly, the pins 26', 26" would not normally be present in the recess 22 simultaneously. The coupler can accommodate attachments having a range of pin spacings between a smallest spacing shown between pins 26 and 26' and a largest spacing shown between pins 26 and 26".

The coupler 10 also includes a first power-operated latching mechanism typically comprising a latching member, in the form of a hook 30, and an actuator 32 typically in the form of a linear actuator such as a hydraulic ram. Other forms of powered actuator could be used (e.g. pneumatic or electrically operated) but hydraulic is convenient because excavators typically have a hydraulic system available at or near the end of the arm. The latching hook 30 and ram 32 are provided between the side plates 15. The latching hook 30, which may comprise one or more aligned hook elements, is pivotably mounted on the body 14 at pivot 11 in any convenient manner and is pivotable about an axis that runs substantially perpendicular to the body 14/plates 15. The hook 30 is pivotable between an open, or non-latching, state and a latching state. In the open state, the latching hook 30 allows the pins 26', 26" to be inserted into or removed from the recess 22. In the latching state, the latching hook 30 prevents the pins 26', 26" from being removed from the recess 22. The actual position of the latching member 30 in the latching state will depend on the pin spacing of the attachment being grabbed. For example, in FIG. 1, the hook 30 is shown in the latching state with respect to pin 26', but in the open state with respect to pin 26". In alternative embodiments, the latching member may be slidably mounted on the body, or otherwise movable between the open state and the latching state(s), without necessarily being pivotable. Further, the latching member need not necessarily take the form of a hook. Conventionally, the recess 22 is said to be at the rear of the coupler and the latching member 30 may therefore be referred to as a rear latching member.

Figure 1:
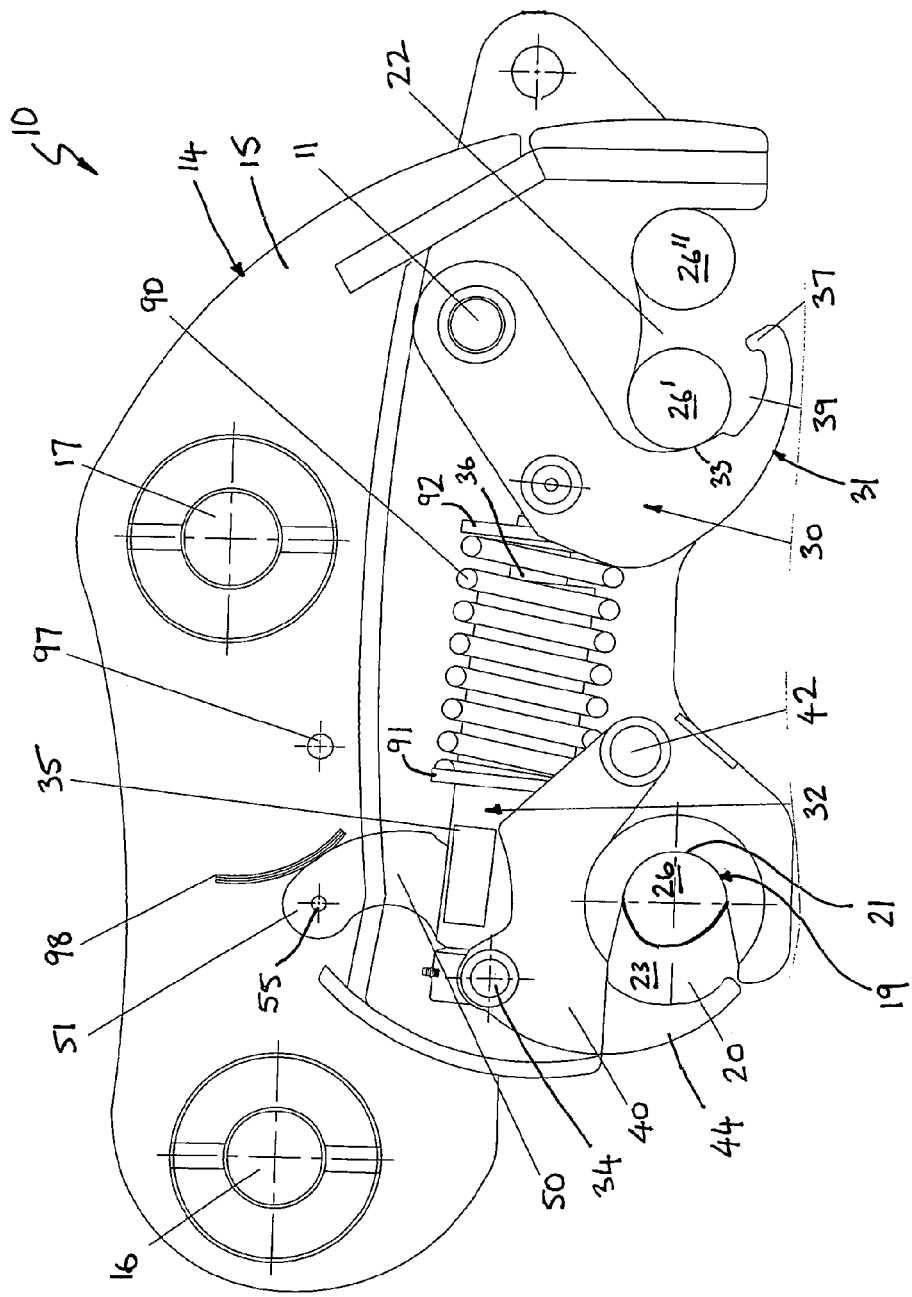
FIG. 1 is side sectional view of a coupler embodying the invention.

The coupler 10 further includes a blocking member, in the form of a hook 40, for retaining an attachment pin 26 in the recess 20. Conventionally, the recess 20 is said to be at the front of the coupler and the blocking member 40 may therefore be referred to as a front blocking member. The blocking member 40 is pivotably mounted on the body 14 in any convenient manner, e.g. pin or bearing, at pivot point 42. The second hook 40 is pivotable about an axis substantially perpendicular to the side plates 15 between an open or non-blocking state (FIG. 9) and a blocking state (FIG. 1). In the non-blocking state, the hook 40 is clear of the recess 20 to the extent that it does not prevent the pin 26 from being removed from the recess 20, while in the blocking state, the hook 40 prevents the pin from being removed from the recess 20. In the illustrated embodiment, the blocking member 40, such as by means of a jaw 44, when in the blocking state, fully, or at least partly, closes the otherwise open mouth of the recess 20. In alternative embodiments, the blocking member 40 may be slidably mounted on the body, or otherwise movable between the open state and the blocking state(s), without necessarily being pivotable. Further, the blocking member 40 need not necessarily take the form of a hook.

Typically, the actuator 32 comprises a piston housing 35 and a piston rod 36, the rod 36 being actuatable into and out of the housing 35 in a reciprocating manner. In the illustrated embodiment, the free, or leading, end of the piston rod 36 is pivotably connected to the latching hook 30, the pivoting movement being about a respective axis that is substantially perpendicular to the plates 15. When the piston rod 36 adopts a retracted state, or relatively retracted state, the latching hook 30 adopts its open state (in FIG. 1, the piston rod 36 is retracted to the extend that the hook 30 is open with respect to the pin 26", although further retraction of the hook 30 would be required for it to adopt the open state with respect to pin 26'). When the piston rod 36 is extended, the hook 30 moves towards its latching state. Depending on the location of the pin 26', 26" in the recess 22, the amount by which the piston rod 36 is extended when the hook 30 reaches its latching state can vary. Hence, in the latching state, the latching member may fully or partly close the otherwise open mouth of the recess 22. Conveniently, the ram 32 is operable via the excavator's hydraulic system (not shown), the controls typically being located in the cab of the excavator.

Advantageously, resilient biasing means, conveniently in the form of a spring 90, is provided on the actuator 32 and arranged to resiliently bias the actuator 32, and in particular the rod 36, into its extended position. The spring 90 may take the form of a compression spring. The spring 90 is shown externally of the actuator 32, for example extending between a first abutment 91 provided on the piston housing and a second abutment 92 provided on the rod 36. Alternatively, the spring, or other resilient biasing means, may be fitted internally of the piston housing. The biasing means may be a mechanical spring as illustrated but may take any suitable alternative form, e.g. a gas spring. The purpose of the spring 90 is to hold the actuator 32 in its extended state and so to hold the latching hook 30 in a forward or latching state in the event of the loss of actuating force from the actuator 32 due, for example, to a hydraulic or mechanical failure of the actuator 32 or its supply. This may be regarded as a redundant safety back up to the extension force of the actuator 32. In use, the actuator 32 provides a primary actuating force that serves to hold the latching hook 30 in its latching state. The action of the spring 90 assists the actuator 32 and so may be said to contribute to the primary actuating force.

In the embodiment of FIG. 1, where the actuator 32 is also coupled (directly or indirectly) to the blocking hook 40, the primary actuating force also serves to hold the blocking member 40 in its blocking state. Therefore, in the event of a failure of the actuator 32, the force exerted by the spring 90 serves not only to urge the rear latching member 30 into its latching state, but also the front blocking member 40 into its blocking state.

In alternative embodiments (not illustrated), as well as, or instead of, the spring 90, other resilient biasing means may be provided to urge the latching member 30 and/or the blocking member 40 into their respective latching/blocking states. For example more than one spring or other biasing device could be provided, which may or may not be incorporated into the actuator 32. For example, one or more respective spring, gas strut or other resilient biasing device may be provided between the body of the coupler and the respective latching member 30, 40. Where both latching members 30, 40 are so biased, separate, independent resilient biasing means may be provided for each latching member. Alternatively, the same resilient biasing means may act, directly or indirectly, on both latching members.

In the embodiment of FIG. 1, the piston housing 35 is coupled to the blocking member 40, conveniently at the butt end of the housing 35. The housing 35 is preferably coupled to the blocking member 40 at a pivot point 34, which may take any suitable form. Hence, the actuator 32 may be said to be coupled, or connected, directly to the blocking member 40. During use, when the piston rod 36 is extended, the piston housing 35 acts on the blocking member 40 to urge it into the blocking state as shown in FIG. 1. For the action of the actuator 32 to correctly move the front and rear latching hooks 40, 30 into and out of position correctly, the forward or latching movement of blocking member 40 should be limited. This may be achieved by any suitable means. For example, a stop (not shown) may be provided on the coupler (conveniently on the body 14) arranged to limit the movement of the part of the actuator that acts on the blocking member 40 (e.g. the free end of the housing 35 in the illustrated embodiment) such that the blocking member 40 adopts the desired position with respect to the body 14 when in its blocking state. The backward or unlatching movement of the rear latching member 30 should also be limited. This may be achieved by any suitable means. For example, a stop (not shown) may be provided on the coupler (conveniently on the body 14) arranged to limit the movement of the latching member 30 such that the latching member 30 adopts the desired position with respect to the body 14 when in its non-latching state.

In alternative embodiments (not illustrated), the orientation of the actuator 32 may be reversed such that the piston rod 36 is coupled to the blocking member 40 and the housing 35 is coupled to the latching member 30.

Under normal operating conditions when the latching hook 30 is in its latching state, the pin 26 located in recess 20 is urged against the rear surface 21 of the recess 20 by the action of the latching hook 30 on the other pin 26', 26" located in the other recess 22 under the force exerted by the actuator 32 and/or the spring 90. For example, as shown in FIG. 1, the force exerted on pin 26' by the hook 30 causes the other pin 26 of the attachment to be pulled against the surface 21 of the recess 20. Preferably, the recess 20 is shaped to define a seat 19 for the pin 26 when engaged with the rear surface 21, the seat 19 being substantially the same width as the pin 26 such that the pin 26 does not move with respect to the recess 26 when seated.

The arrangement is such that, with the pin 26 held against the surface 21, a gap 23 is defined between the pin 26 and the blocking member 40 when closed. The gap 23 may conveniently be created by selection of the shape, size and/or positioning of the blocking member 40, and in particular the jaw 44.

Should the extension force exerted by the actuator 32 on the latching hook 30 be reduced for any reason, the forces exerted on the attachment during subsequent operation of the excavator will cause the attachment pin 26 to move back and forwards within the recess 20 by virtue of the gap 23. Movement of the pin 26 within the recess 20 results in a shake or rattle of the attachment that is detectable by the operator of the excavator and which may be taken as an indication that a failure has occurred. Hence, blocking member 40 when in the blocking state defines together with its respective recess 20 a station 23 for the pin 26, the station being shaped and dimensioned to allow movement of the pin with respect to the coupler body.

Figure 4:
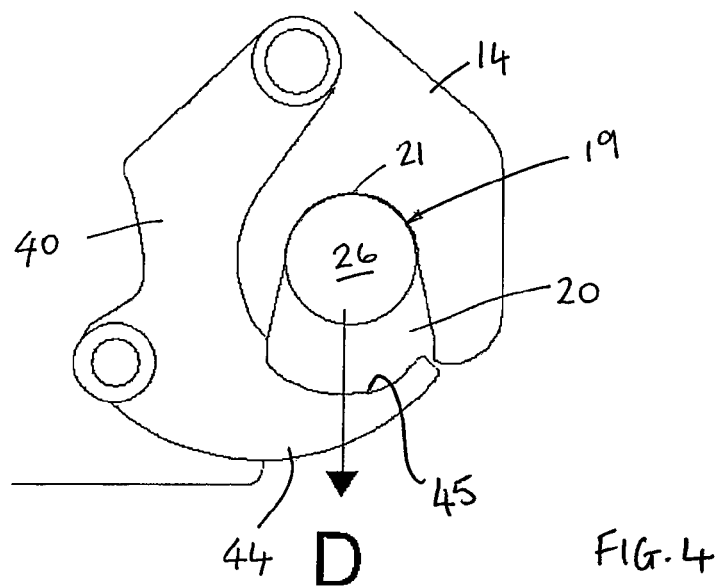
FIG. 4 is a side view of part of the coupler of FIG. 1, showing a blocking hook in a closed state during normal operation.

FIG. 4 illustrates the normal position of the attachment pin 26 within the front recess 20 of the coupler 10 when the attachment is clamped (both members 30, 40 in the latching/blocking state). As described above, the pin 26 is normally held against the rear surface 21 indirectly by the action of the actuator 32 and, when present, the spring 90. Arrow D shows the direction of the force that is exerted on the pin 26 by the weight of the attachment in a typical (vertical) orientation of the coupler 10, which force acts on the pin 26 to pull it from the recess 20.

Figure 5:
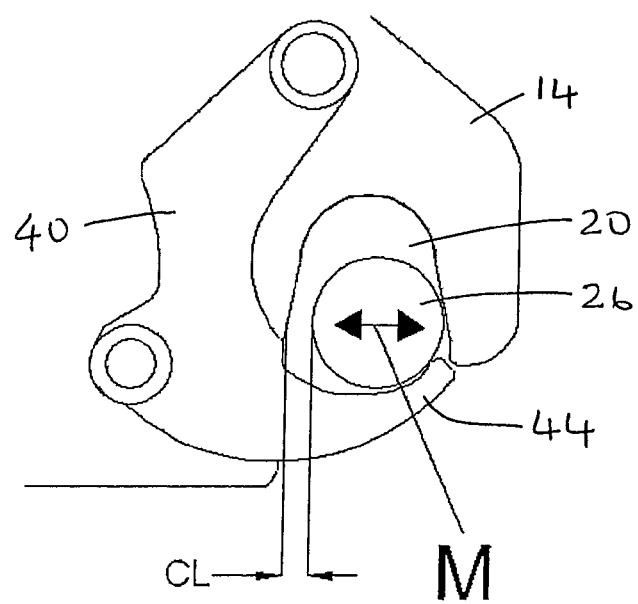
FIG. 5 is an alternative side view of said part of the coupler of FIG. 1, showing the relative positions of the blocking hook and the attachment pin in the event of a failure.

FIG. 5 illustrates the position of the pin 26 which would be typical if there was a failure of the actuator 32 in the illustrated vertical coupler orientation. The weight of the attachment acting through the other pin 26', 26" against the latching hook 30 forces the latching hook 30 to move (against the bias of the spring 90) in a direction towards its non-latching state such that the pin 26 moves within the front recess 20, and in particular out of its seat 19 against the surface 21. The pin 26 is prevented from leaving the recess 20 by the closed blocking member 40. The width of the recess 20 (in the horizontal direction as viewed in FIG. 5) beyond the seat 19 is advantageously greater than the width of the pin 26 to facilitate rattling of the pin 26 when it is out of its seat. In preferred embodiments, the recess 20 widens in a direction from the rear surface 21 towards the mouth, and may for example be tapered as shown in the drawings. The hook 40, and in particular its jaw 44, may also be shaped to facilitate rattling of the pin 26. For example, the jaw 44 may be shaped to present a curved and preferably substantially smooth surface 45 to the pin 26, which facilitates movement of the pin 26 along the surface 45 when the two are engaged. The surface 45 may be provided in a recessed portion of the jaw 44. In FIG. 5, the pin 26 is shown engaged with the jaw 44 under the weight of the attachment, the pin 26 being able to move back and forth within the recess 20 in the direction indicated by arrow M.

It will be apparent that the pin 26 is also able to move within the space 23 in other, non-vertical, orientations of the coupler when there is a hydraulic failure.

Referring again to FIG. 1, the latching member 30 has a jaw portion 31. The jaw portion 31 has a primary pin-engaging surface 33, a free end 37 and a recess 39 formed between the primary pin-engaging surface 33 and the free end 37. Preferably, the arrangement is such that a lip is provided at the free end 37.

Figure 2:
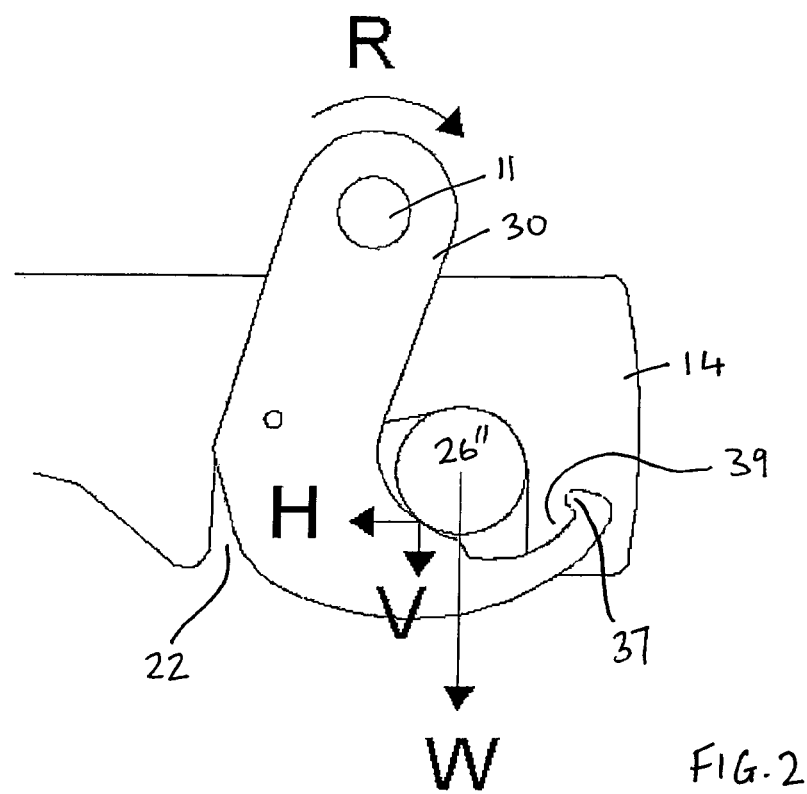
FIG. 2 is a side view of part of the coupler of FIG. 1, showing a latching hook in a latched state engaging with an attachment pin during normal operation.

During normal operation of the coupler, when the latching hook 30 is in its latching state the primary pin-engaging surface engages with the pin 26', 26" (see FIGS. 1 and 2). However, should the latching hook 30 retract towards the non-latching state (for example under the weight of the attachment in the event of a failure of the actuator 32 as described above), the pin 26', 26" moves off the primary pin-engaging surface 33 (under the weight of the attachment) and the pin 26', 26" is able to enter the recess 39. Hence, space is created within which the pin 26', 26" can move during further operation of the excavator. This space allows movement of the attachment with respect to the coupler 10 that manifests as a shake or rattle of the attachment that is detectable by the operator of the excavator and which may be taken as an indication that a failure has occurred. Hence, the latching member 30 when in the latching state is movable to define, together with its respective recess 22, a station for the pin 26', 26", the station being shaped and dimensioned to allow movement of the pin 26', 26" with respect to the coupler body.

Advantageously, both the front and rear pins 26, 26', 26" are able to rattle in the respective manners described herein, the cumulative effect increasing the detectability of the failure to the operator.

As is explained in further detail below, in the event of a failure of the actuator 32, the spring 90 (or other resilient biasing means), the latching member 30 and the blocking member 40 together hold the front and rear pins in their respective recesses to allow continued operation of the coupler, while allowing the pins to move with respect to the coupler to create a rattling movement (which may be accompanied by a corresponding noise and/or sensation) that can indicate to the operator that a failure has occurred. This is facilitated by shaping the latching member 30 such that it can retain its pin. The arrangement of the latching member 30 and the spring/resilient biasing means is such that the resilient bias acting on the latching member 30 counterbalances the weight acting on the latching member 30 through the pin while the shape of the latching member 30 retains the pin, i.e. prevents the pin from falling off the latching member under the weight of the attachment.

The recess 39 is preferably wider than the width of the pin 26', 26" to allow the pin to fit into the recess 39. It is also preferred that the radius of the surface of the jaw 31 that defines the recess 39 is greater than the radius of the pin 26', 26".

Advantageously, the surface of the jaw 31 is shaped to define a step at the transition of the primary pin-engaging surface 33 and the recess 39. This helps to create a gap between the pin 26', 26" when the hook 30 is withdrawn even by a relatively small amount. The surface of the jaw 31 is preferably also shaped in the illustrated embodiment to define a step at the opposite end of the recess 39 to create the lip 37. This helps to retain the pin 26', 26" in the recess 22 in the event of a failure. It will be understood that the hook 30 may take alternative shapes, with or without a recess, that create a gap between the pin 26', 26" when the hook 30 is withdrawn even by a relatively small amount in the event of a failure, which gap is large enough to allow the desired rattle.

FIG. 2 illustrates the loading on the latching member 30 when the coupler is horizontal. Arrow W represents the weight of the attachment acting through the pin 26" (it will be apparent that the weight of the attachment acting though any of the pins 26, 26', 26" is not necessarily the whole weight of the attachment since, depending on the state and orientation of the coupler, the whole weight of the attachment may be shared by the latching member, the blocking member and/or the coupler body). This results in two resultant forces being imparted into the primary locking member: a horizontal force H and a vertical force V. The resultant of these two forces tends to rotate the latching member 30 in the direction of arrow R. Normally, this force is resisted by the actuator 32 and spring 90.

Figure 3:
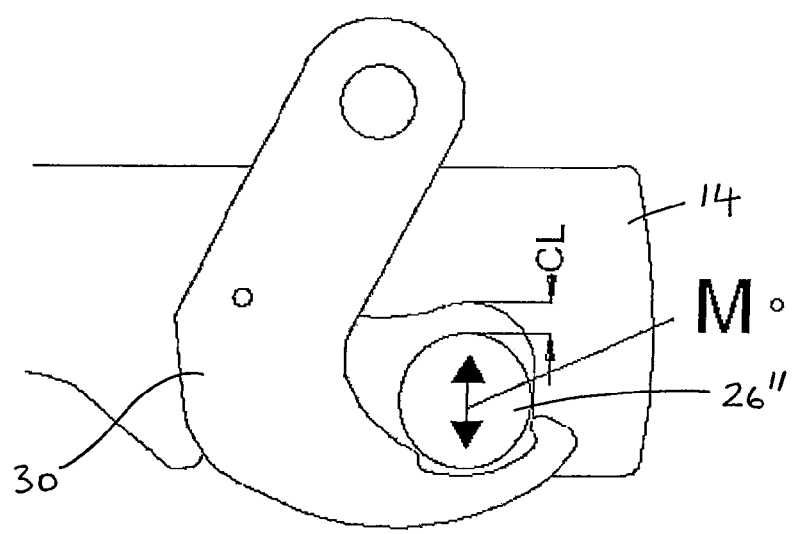
FIG. 3 is an alternative side view of said part of the coupler of FIG. 1, showing the relative positions of the latching hook and the attachment pin in the event of a failure of the primary actuating force.

FIG. 3 illustrates what happens in the event of a failure causing a reduction of the force exerted on the latching member 30 by the actuator 32, e.g. in the case of a seal failure or other hydraulic failure. The latching member 30 tends be forced in the direction of arrow R as indicated in FIG. 2. In the illustrated embodiment, spring 90 provides an additional force resisting the rotation in direction R, which tends to hold, or at least to urge, the latching member 30 into the latching state. However, as the attachment is employed in its normal manner, the resultant forces H and V would typically overcome the resisting force provided by the spring 90. When this occurs the attachment pin 26" travels downwardly along the internal profile of the rear latching member 30. As a result of the internal shape of the latching member 30, during an initial movement of the pin 26" from its latched position the weight acting through the pin 26" causes the latching member 30 to move away from its latching state (clockwise movement as viewed in FIG. 2). This movement continues until the force applied to the latching member 30 by the spring 90 counter-balances the un-latching moment, or force, caused by the weight acting through the pin 26", at which stage an equilibrium state may be reached in which the latching member 30 ceases to move away from the latching position.

It can be seen that, when the actuator 32 is working, the latching member 30 holds the pin 26" in a first position with respect to the recess 22 and, upon failure of the actuator 32, the latching member 30 holds the pin 26" in a second position in, or with respect to, the recess 22. The first position may vary depending on the pin spacing of the attachment. The second position may vary depending not only on pin spacing, but also on other factors including the orientation of the coupler, the weight of the attachment and the strength of the spring.

The latching member 30, and in particular its internal profile, is shaped so that it is capable of retaining the pin 26" when this equilibrium state is reached, i.e. such that the pin 26" does not fall off the latching member 30 and out of the recess 22 as the pin 26" falls in the event of a hydraulic failure. To achieve this, the internal profile includes a concave portion and/or the free end of the latching member 30 conveniently has an upturned portion, or lip. More generally, this can be achieved by shaping the internal profile of the latching member 30 such that, when the equilibrium state is reached, the internal profile of the latching member 30 extends around the pin 26" at least to beyond the central vertical axis of the pin 26" (at least when the coupler is in a horizontal orientation). In preferred embodiments, a recessed portion is provided in the internal profile at or adjacent the free end of the latching member, for example recess 39. The recessed portion is shaped to receive and retain the pin 26" and, to this end, is concave and/or defines a lip at its end that is nearest the free end of the latching member 30. In the illustrated embodiment, when the equilibrium state is reached, the pin 26" falls into the retaining recess 39.

Hence, when there is a failure resulting in loss of force applied by the actuator, the spring 90, or other resilient bias, together with the shape of the latching member 30 act to retain the pin 26" within its recess. The foregoing description relates particularly to cases where the coupler is substantially horizontal, but a similar description applies to other orientations of the coupler. In cases where the coupler is tilted such that the front end moves above the rear end, the weight acting on the latching member 30 through the pin 26" tends to decrease, allowing the spring force to move the latching member towards its latching state thereby retaining the pin. In addition, the hook shape of the recess 20 allows the pin 26 to be retained in the recess 20, especially since the orientation of the recess 20 with respect to the coupler is such that the recess 20 opens upwardly when the coupler is in this vertical orientation. In cases where the coupler is vertical with the rear end above the front end (see for example FIGS. 6 and 7) the retention of the other pin 26 by the front hook 40 facilitates retaining the rear pin 26" in its recess 22. To this end, the blocking member 40 is preferably pivotably coupled to the body at a pivot point 42 that is above said second recess 20 when the coupler is in said vertical orientation such that the force caused by the weight of the attachment on said blocking member does not cause said blocking member to move to a non-blocking state, or at least such that the force acting on the blocking member caused by the weight of the attachment via the pin 26 is balanced by the spring 90 to prevent the blocking member 40 from moving out of its blocking state. More preferably, the internal profile of said blocking member is shaped, preferably concave, such that the force caused by the weight of the attachment on said blocking member causes said blocking member to tend to move to the blocking state.

Figure 6:
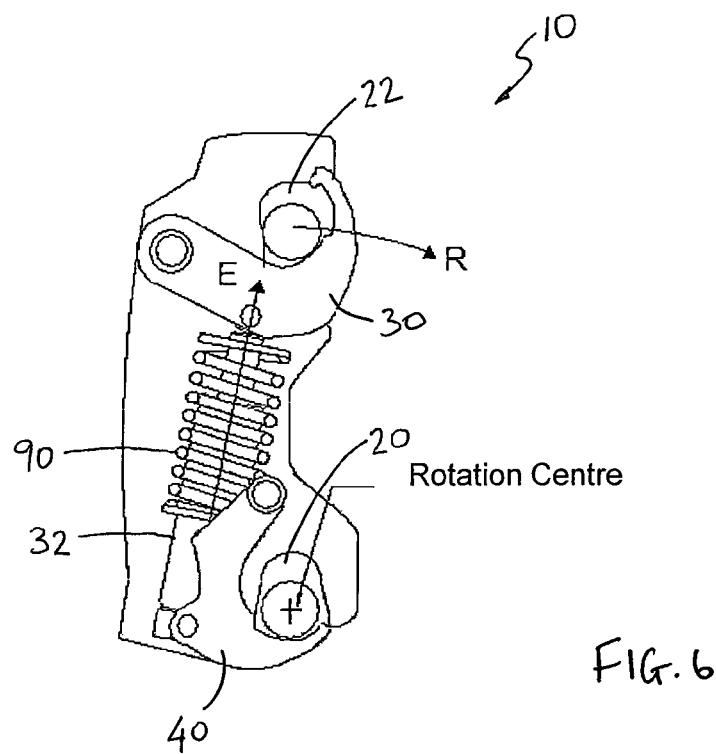
FIGS. 6 and 7 are respective side views of the coupler of FIG. 1 in the event of a failure of the primary actuating force.

Due to the shape of the internal profile of the rear latching member 30, and in particular the lip, further rotation in an unlatching direction would require the attachment pin 26" to move in a direction away from the upturned portion of the recess 39. This upward movement relative to the upturned portion of the recess 39 is resisted either by the weight of the attachment directly in the case of the coupler being in a substantially horizontal attitude, or by the weight of the attachment causing a rotation of the attachment around the front attachment pin 26 within recess 20 in the direction R as indicated in FIG. 6 in any other orientation. However should this movement occur caused by inertia of the attachment during the re-orientation of the coupler during the normal working cycle of the machine, then this will also cause a reduction in the unlatching moment imparted to the rear latching member 30 hence the action of the biasing means 90 will urge the rear latching member 30 towards its latching state. Consequently the shape of the internal profile of the latching member 30 together with the action of the biasing means 90 will effectively retain pin 26" within the rear aperture 22.

Provision of a recess in the internal profile of the latching member 30 is advantageous since it facilitates the creation of the aforementioned rattle as is now described.

Movement of the pin 26" causes a clearance distance (CL), or gap, to be formed between the pin 26" and the surface of the recess 22. During any subsequent normal operation of the attachment, the pin 26" may move out of the recess 39. When this occurs the action of the spring 90 causes the latching member 30 to move back into the original latching state. However, if the attachment continues to be used with reduced engagement force on the latching member 30, the above cycle will be repeated causing the attachment to rattle upon the coupler. In the embodiment, therefore, the recess 39 and the spring 90 function together to allow the rattle, and do so without allowing the rear pin of the attachment to escape from the recess 22.

It is noted that, in the illustrated embodiment, the recess 39 performs two functions. First, it provides the latching member 30 with a shape that is capable of retaining the pin 26" in the event that the primary force acting on the latching member 30 fails completely or is reduced. Second, it creates room to facilitate the provision of the pin rattle. However, each of these functions could be provided independently of the other and do not necessarily require the presence of a recessed portion in the internal profile of the latching member 30. For example, the internal profile of the latching member 30 may alternatively be shaped to extend around the pin 26" past its central vertical axis (at least when the coupler is horizontal), e.g. the internal profile may comprise a suitably curved portion without a recess for receiving the pin. Alternatively still, or in addition, the free end of the latching member may be sufficiently long that the pin 26" cannot fall off before the spring 90 halts the movement of the latching member 30 in the unlatching direction (this does not necessarily require the free end of the latching member 30 to be curved). However the provision of such a recess in the internal profile is particularly advantageous in cases where the coupler has to accommodate attachments with different pin spacings since it helps to ensure that the latching member 30 can get past the pin irrespective of its position in the aperture 22.

It will be apparent that the foregoing description of FIGS. 2 and 3 apply to all pin spacings, not just the largest pin spacing represented by the pin 26".

FIG. 6 illustrates by way of example the operation of the coupler 10 in the event of failure of the primary engagement force, e.g. a failure of the actuator 32. In this illustration, the pins 26, 26', 26" move vertically downwards under the weight of the attachment (this weight being sufficient to move the latching member 30 against the resisting force of the spring 90). The pin 26 in recess 20 moves until it contacts the blocking member 40. In this state, the pin 26 is rotated about its own longitudinal axis under the weight of the attachment. In addition, the pin 26' in recess 22 is caused to rotate about the pin 26, as illustrated by arrow R.

Figure 7:
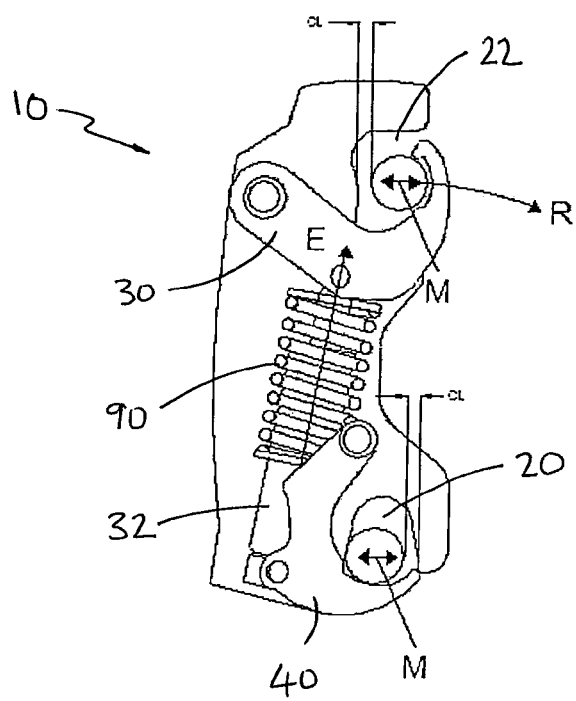

FIG. 7 illustrates the movement of the latching member 30 caused by the force exerted by the rear pin 26' moving in the direction of R as shown in FIG. 6. The illustrated movement of the latching member 30 is resisted by the extension force (E) of the spring 90. The rear pin 26' is then captured within the recess 39. The state of the coupler 10 shown in FIG. 7, and in particular the respective gaps CL formed between the pins 26, 26' and their recess 20, 22, allows the pins 26, 26' to move in each recess 20, 22. This causes the attachment to shake or rattle on the coupler indicating that a failure of the primary engagement force has occurred, whilst still preventing separation of the attachment from the coupler.

Figure 11:
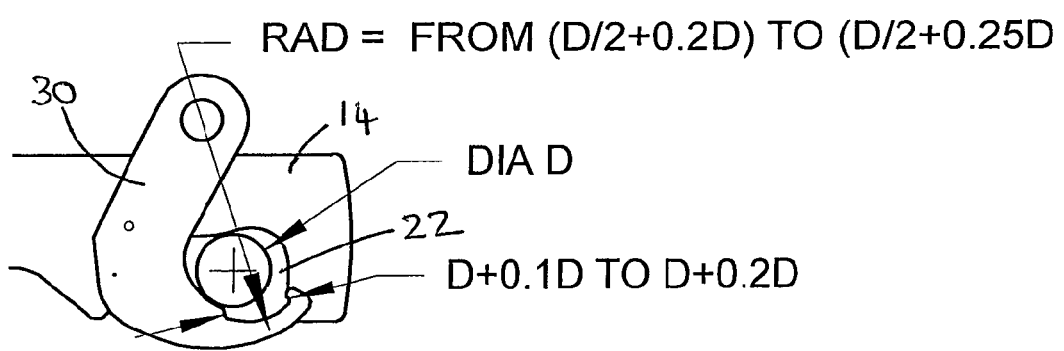
FIGS. 11 and 12 are respective views of parts of the coupler of FIG. 1.

By way of example, FIG. 11 illustrates a suitable size of the retaining recess 39. The radius of the recess 39 may be from D/2+0.2 D to D/2+0.25 D, where D is the diameter of the attachment pin 26', 26". A preferred width of the retaining recess 39 is from D+0.1 D to D+0.2 D. Depending on the size of the coupler, this may need to be reduced as a result of space constraints.

Figure 12:
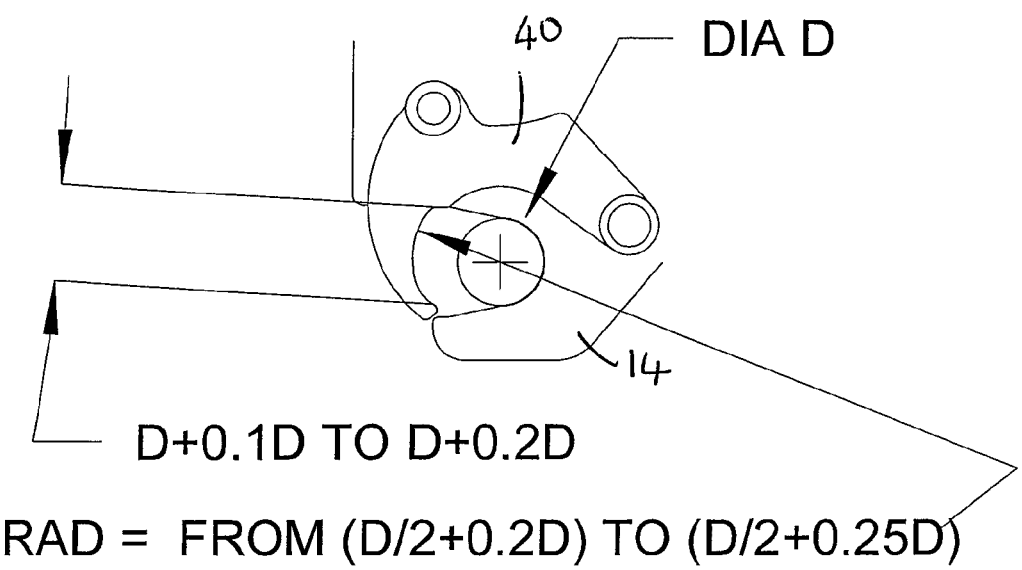

FIG. 12 illustrates a suitable size of the retaining surface 45, or retaining recess, provided in the blocking member 40. The radius of the surface 45 may be from D/2+0.2 D to D/2+0.25 D, where D is the diameter of the attachment pin 26. A preferred width of the retaining surface/recess 45 is from D+0.1 D to D+0.2 D. Depending on the size of the coupler, this may need to be reduced as a result of space constraints.

It will be seen from the foregoing that one or both of the latching/blocking members 30, 40 may adopt more than one physical position with respect to the coupler body while still remaining in its latching state/blocking state. In the illustrated embodiment, this is particularly true of the latching member 30, which may adopt different positions in the latching state depending on the pin spacings of the attachment, and/or when the actuator 32 fails. In the latter case, failure of the actuator 32 allows the latch 30 to move (clockwise as viewed in FIG. 1) while still remaining in the latching state.

Figure 13:
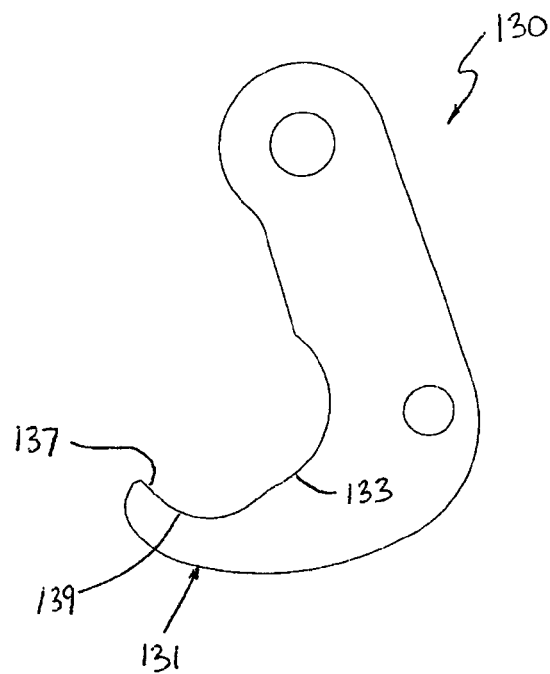
FIG. 13 shows a latching member for use with couplers embodying the invention.

FIG. 13 shows a side view of an alternative latching member 130 that may be used in place of the latching member 30. The latching member 130 has a jaw portion 131 whose internal profile has a primary pin-engaging surface 133, a free end 137 and a recessed portion 139 formed between the primary pin-engaging surface 133 and the free end 137. The recessed portion 139 is recessed with respect to the surface 133 and preferably also with respect to the free end of the latching member 130. The recessed portion 139 is preferably wide enough to receive the pin. Ideally, the recessed portion 139 is located substantially at the free end 137. The recessed portion 139 is typically concave such that it defines a lip at the end closest to the free end 137.

When the coupler is working normally (no failure of the actuator 32) the surface 133 engages with the pin 26', 26". The shape of the surface 133 is such that the latching member 130 drives the pin towards the body of the attachment. Preferably, the surface 133 is shaped so that when in latching engagement with the pin, it is disposed at an angle of approximately 45 degrees with respect to vertical (when the coupler is horizontal).

When there is a reduction of force on the latching member 130, e.g. a failure of the actuator, the pin 26, 26" enters the recessed portion 139. Since the recessed portion 139 is concave, or at least has an upturned lip at its free end, the latching member 130 is able to bear a portion of the weight acting through the pin 26, 26" and so allow an equilibrium state to be reached where the latching member 130 and the spring 90, or other resilient bias, retain the pin 26, 26" in the recess 22.

A similar effect can be obtained without a recessed portion 139, 39. For example the internal profile could be shaped to more closely follow the shape of the pin when the latching member 130 is in latching engagement with the pin, e.g. a curvature that, from the point of normal pin contact with surface 133, substantially matches the curvature of the pin. However, this makes it difficult for the latching member 130 to accommodate attachments with different pin spacings. Alternatively, the internal profile may extend substantially tangentially from the point of normal pin contact with surface 133. However, this makes it more difficult to reach the equilibrium state where the where the latching member 130 and the spring 90, or other resilient bias, retain the pin 26, 26" in the recess 22. The recessed portion 139, 39 also facilitates the rattle feature described above.

Figure 13A:
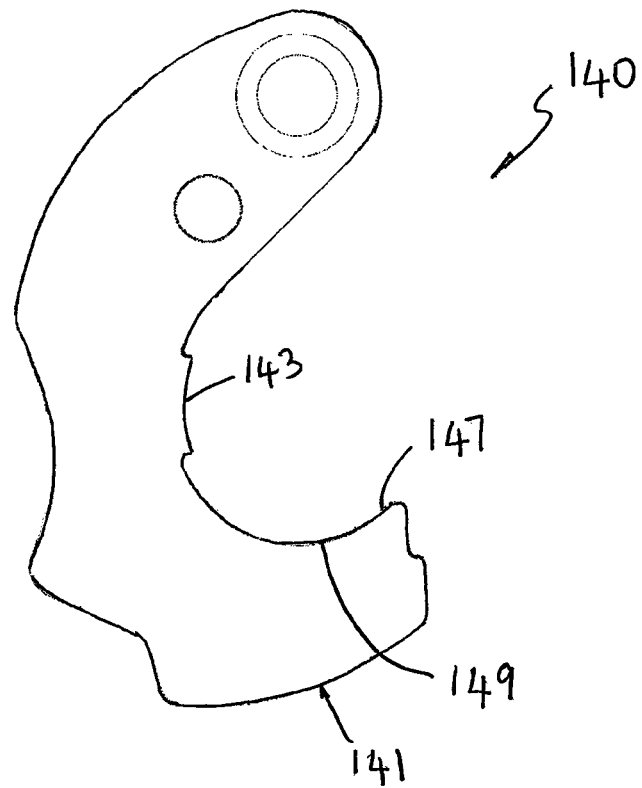
FIG. 13A shows a blocking member for use with couplers embodying the invention.

FIG. 13A shows a side view of an alternative blocking member 140 that may be used in place of the blocking member 40. The blocking member 140 has a jaw portion 141 whose internal profile has a free end 147 and a recessed portion 149 which located between, and is recessed with respect to, the free end of the blocking member 140 and an inner portion 143 of the internal profile. The recessed portion 149 is preferably wide enough to receive the pin. Ideally, the recessed portion 149 is located substantially at the free end 147. The recessed portion 149 is typically concave such that it defines a lip at the end closest to the free end 147.

When there is a reduction of force on the latching member 30, e.g. a failure of the actuator, the pin 26 may contact the recessed portion 149 as previously described. Since the recessed portion 149 is concave, or at least has an upturned lip at its free end, the blocking member 140 is able to bear the weight acting through the pin 26, and so allow an equilibrium state to be reached where the blocking member 140 retains the pin 26 in the recess 20.

A similar effect can be obtained without a recessed portion 149. For example the internal profile could be shaped to more closely follow the shape of the pin when the blocking member 140 is in blocking engagement with the pin, e.g. a curvature that substantially matches the curvature of the pin. The recessed portion 149 also facilitates the rattle feature described above.

Optionally, the coupler 10 includes a gravity-actuated blocking member, or positioner, in the form of a bar 50. The gravity operated blocking member 50 is pivotable with respect to the body 14 about an axis that is substantially perpendicular with the plates 15. In the illustrated embodiment, the bar 50 has one end 51 pivotably mounted on the body 14 at pivot 55, the other end 53 being free. The bar 50 is movable between a blocking state (shown in FIG. 1) and a non-blocking state (shown in FIG. 9). In the blocking state, the bar 50, or at least its free end 53, lies in the path of the blocking hook 40 such that it prevents the blocking hook from moving from its blocking state to its non-blocking state. The bar 50 is pivotable with respect to the body between the blocking and non-blocking states under the action of gravity.

Advantageously, the gravity operated blocking member 50 forces the operator to place the coupler in an appropriate orientation for the safe and controlled release of the attachment.

Figure 14:
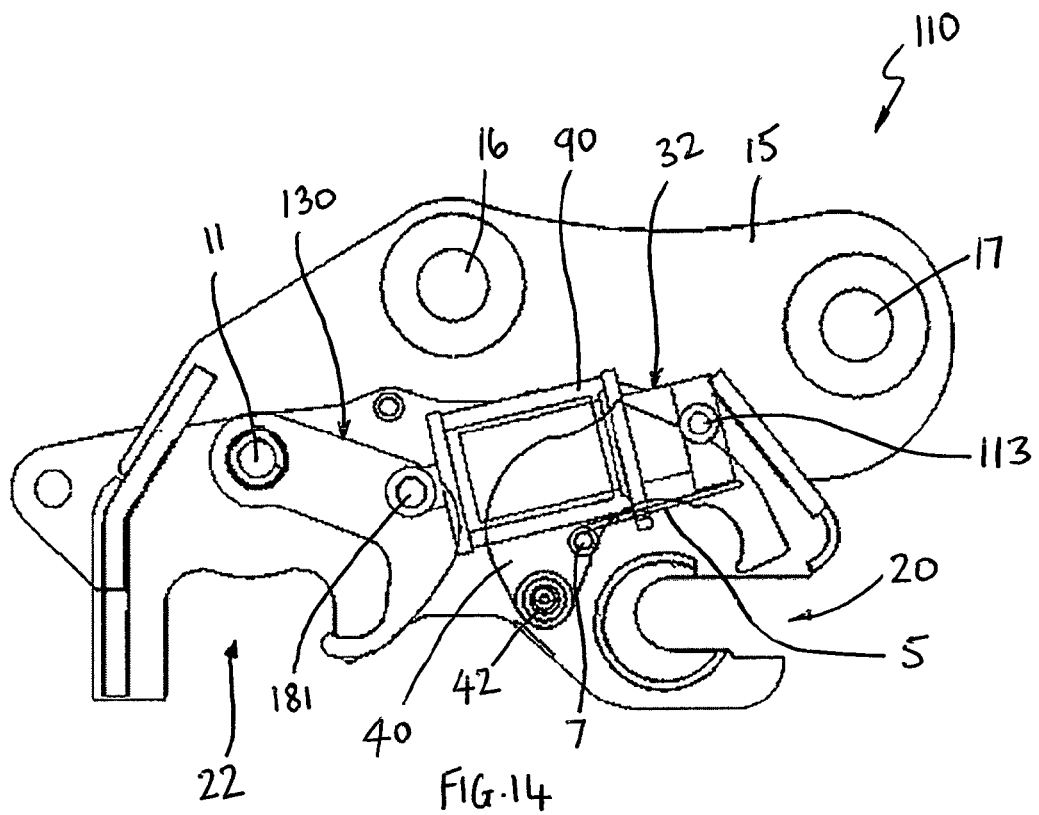
FIG. 14 shows a side view of an alternative embodiment of a coupler embodying the invention, shown with the latching member and blocking member in the respective non-latching and non-blocking states.
Figure 15:
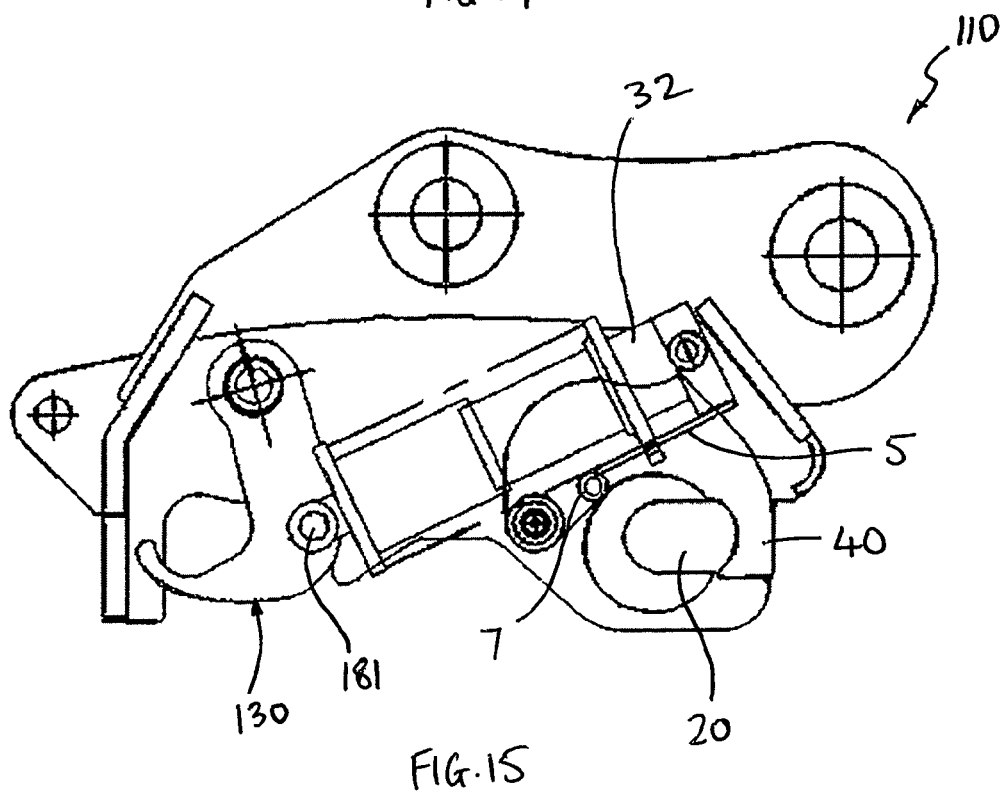
FIG. 15 shows an alternative side view of the coupler of FIG. 14 with its front and rear latching hooks in their respective latching/blocking states.

Referring now to FIGS. 14 and 15, an alternative embodiment of a coupler is shown as 110. The coupler 110 is generally similar to the coupler 10, like numerals being used to denote like parts and a corresponding description applying as will be apparent to a skilled person.

In this embodiment, the actuator 32 has one end (typically the extendible rod end) pivotably coupled to the rear latching member 130 (see pivot point 181) and the other end pivotably mounted on the body of the coupler 110 (see pivot point 113). The actuator 32 is coupled to the front blocking member 40 so that pivoting movement of the actuator 32 with respect to the body of the coupler (which occurs as the actuator 32 extends to move the front blocking member 130 into its latching state) causes the front blocking member 40 to move from its non-blocking state to its blocking state. This can best be appreciated by a comparison of FIGS. 14 and 15. When the actuator 32 is retracted, the front blocking member 40 is able to move from its blocking state to its non-blocking state, and is caused to move to the non-blocking state in the illustrated embodiment.

Preferably, the actuator 32 is coupled to the front blocking member 40 via a resiliently deformable member 5. The resiliently deformable member 5 is conveniently connected (directly or indirectly) to the front blocking member 40, for example mounted on a mounting pin 7 provided on the front blocking member 40. The member 5 is arranged to impart movement of the actuator 32 to the blocking member 40 as the actuator 32 is extended and preferably also as it is retracted. In the illustrated embodiment, the member 5 is connected (directly or indirectly) to both the actuator 32 and the blocking member 40 such that extension of the actuator causes the blocking member 40 to adopt its blocking state while retraction of the actuator causes blocking member 40 to adopt its non-blocking state. The resiliently deformable member 5 extends substantially parallel to the piston rod of the actuator 32 to engage a portion of the actuator body. In the embodiment shown, the resiliently deformable member 5 comprises an elongate strip or rod, for example formed from spring steel, and having a retained, e.g. coiled, end attached to the mounting pin 7 and a straight section extending therefrom and passing through a receiving aperture formed in a projection provided on the actuator body. By way of example, the member 5 may comprise a leaf spring.

As the actuator 32 extends, this causes latching member 130 to rotate around its fixed pivot point 11. This rotation of the latching member 130 combined with the extension of actuator 32 causes the angle of the actuator 32 with respect to the coupler body to change as the piston rod follows the arc described by its attachment point 181 to latching member 130. This change in angle is translated via the resiliently deformable member 5 into a vertical movement of the deformable member's attachment point 7. The result of this is that the front blocking member 40 is caused to rotate around its pivot 42. The mechanism is designed such that extension of the actuator 32 will cause the front blocking member 40 to move to its latching position closing the front pin receiving recess 20 of the coupler. Retraction of the actuator 32 will cause the front blocking member 40 to move to a position clear of the front pin receiving recess 20 effectively opening the front recess 20 of the coupler.

An additional benefit of the use of the resiliently deformable member 5 is that, should the movement of the front blocking member 40 be obstructed, e.g. by the gravity blocking lever previously described, then the movement caused by the change in extension of the actuator 32 will cause a deformation of the resiliently deformable member 5 and not impose any excessive loading upon any pivots or linkages within the coupler mechanism.

Figure 16:
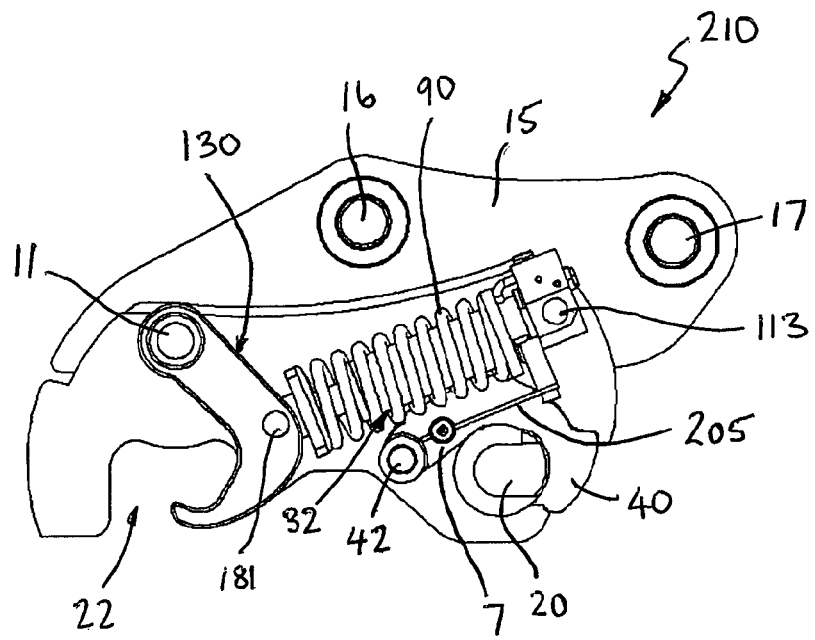
FIG. 16 shows a side view of a further alternative embodiment of the coupler with its front and rear latching hooks in their respective latching/blocking states.

In FIG. 16, an alternative embodiment of a coupler is shown as 210. The coupler 210 is generally similar to the couplers 10, 110 like numerals being used to denote like parts and a corresponding description applying as will be apparent to a skilled person. The coupler 210 has a preferred arrangement of the deformable member 205.

In this case, the deformable member 205 is anchored to the body of the actuator 32 and passes through a receiving aperture formed in the mounting pin 7 (or other suitable part of the blocking member 40).

Figure 17:
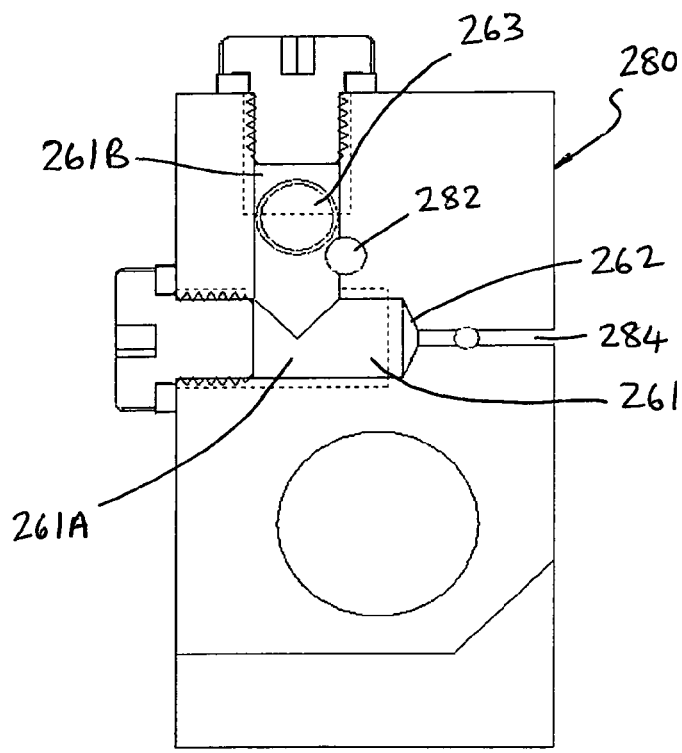
FIG. 17 shows an embodiment of a gravity operated valve.

FIG. 17 shows a gravity operated valve 280 that is suitable for use with a hydraulic actuator and a coupler as described above. The valve 280 has a valve stop 263, conveniently a free floating ball, movable in a passage 261 that comprises two sections 261A, 261B and a valve seat 262. A fluid inlet 282 allows oil into the passage 261 and a fluid outlet 284 allows fluid out of the passage 261 when the ball 263 is not in its seat 262. Preferably, the sections 261A, 261B are perpendicular to one another to create an L-shaped passage 261. It will be seen that the ball 263 can prevent fluid from reaching the outlet not only when in its seat 262, but also when it is in the section 261A of the passage. Effectively, the section 261A serves as part of the valve seat for the ball 263. The use of an L-shaped passage 261 means that, the ball 263 is not clear of the inlet in section 261B until the valve is rotated through more than 90 degrees.

The invention is not limited by the embodiments described herein, which may be modified or varied without departing from the scope of the invention.

The invention claimed is:

1. A coupler for coupling with an attachment, the coupler comprising a body having a first and second spaced-apart recesses for receiving respective pins of said attachment; a latching member movable into and out of a latching state in which it is capable of retaining the respective attachment pin in said first recess; actuating means for actuating said latching member into and out of said latching state; a blocking member movable into and out of a blocking state in which it is capable of retaining the respective attachment pin in said second recess; actuating means for actuating said blocking member into and out of said blocking state; resilient biasing means for resiliently biasing said latching member into its latching state; and resilient biasing means for resiliently biasing said blocking member into its blocking state, wherein said latching member has a primary pin-engaging surface, a free end and a pin-retaining portion between the primary pin-engaging surface and the free end, wherein said coupler is operable in a normal mode in which said primary pin-engaging surface of said latching member is engaged with the respective attachment pin to hold said respective pin in a first position in said respective recess under the action of said actuating means for actuating said latching member, and upon failure of said actuating means for actuating said latching member the coupler is operable in a failure mode in which said pin-retaining portion of said latching member is engaged with said respective attachment pin to hold said respective pin in a second position, different from said first position, with respect to said respective recess, and wherein in said failure mode said coupler adopts an equilibrium state in which the biasing force of said resilient biasing means for resiliently biasing said latching member balances with the un-latching force caused by the weight of the attachment acting on said latching member through said respective pin in said pin-retaining portion to cause the latching member to hold said respective pin in said second position.

2. A coupler as claimed in claim 1, wherein said latching member has a jaw portion whose internal profile has a primary pin-engaging surface for holding said respective pin in said first position, a free end and a recessed portion formed between the primary pin-engaging surface and the free end, and wherein said recessed portion provides said pin-retaining portion of the latching member.

3. A coupler as claimed in claim 2, wherein said recessed portion is recessed with respect to said primary pin-engaging surface.

4. A coupler as claimed in claim 2, wherein said recessed portion is wide enough to receive said respective pin.

5. A coupler as claimed in claim 2, wherein said recessed portion is located substantially at said free end.

6. A coupler as claimed in claim 1, wherein the length of said latching member is selected to allow, in said equilibrium state, the biasing force of said resilient biasing means to overcome the turning moment imparted to the latching member by the weight acting through the pin before the pin falls off the end of the latching member.

7. A coupler as claimed in claim 1, wherein the shape of said pin-receiving portion is configured to allow, in said equilibrium state, the biasing force of said resilient biasing means to overcome the turning moment imparted to the latching member by the weight acting through the pin before the pin falls off the end of the latching member.

8. A coupler as claimed in claim 1 wherein, in said equilibrium state, said latching member, together with its respective pin-receiving recess, define a station for said respective pin, said station being shaped and dimensioned to allow movement of said respective pin with respect to the coupler body.

9. A coupler as claimed in claim 8, wherein said latching member has a jaw portion whose internal profile has a primary pin-engaging surface for holding said respective pin in said first position, a free end and a recessed portion formed between the primary pin-engaging surface and the free end, and wherein said recessed portion provides said pin-retaining portion of the latching member, and wherein said recessed portion of the latching member together with the respective pin-receiving recess, define said station.

10. A coupler as claimed in claim 1, wherein said blocking member when in the blocking state defines, together with said second pin-receiving recess, a station for said respective pin, said station being shaped and dimensioned to allow movement of said respective pin with respect to the coupler body, and wherein, in a first mode of use in which said latching member adopts said latching state, said respective pin in said second pin-receiving recess is held against a surface of said second pin-receiving recess under the action of said actuating means for actuating said latching member on the other attachment pin through said latching member, and wherein in response to a failure said actuating means for actuating said latching member, said respective pin in said second pin-receiving recess is movable to said station.

11. A coupler as claimed in claim 10, wherein the internal profile of the blocking member is shaped such that engagement of the respective attachment pin with the blocking member when in its blocking state urges the blocking member into its blocking state.

12. A coupler as claimed in claim 11, wherein said internal profile of the blocking member has a concave portion for engaging with said respective attachment pin when in its blocking state.

13. A coupler as claimed in claim 10, wherein, in response to a failure of said actuating means for actuating said latching member acting on said latching member and in a substantially vertical orientation of said coupler in which said first recess is above said second recess, said blocking member in its blocking state engages with said respective pin in said second recess upon movement of said pin into said station to retain said pin in said second recess.

14. A coupler as claimed in claim 13, wherein said resilient biasing means for resiliently biasing said blocking member is arranged to balance the force caused by the weight of the attachment acting on said blocking member through said respective pin to cause the blocking member to maintain its blocking state.

15. A coupler as claimed in claim 13, wherein said blocking member is pivotably mounted on said coupler body at a pivot point that is above said second recess when the coupler is in said substantially vertical orientation.

16. A coupler as claimed in claim 1, wherein said actuating means for actuating said latching member and said actuating means for actuating said blocking member comprise a common actuator coupled to both the latching member and the blocking member.

17. A coupler as claimed in claim 16, wherein the respective ends of the actuator are pivotably coupled to a respective one of the latching member and blocking member.

18. A coupler as claimed in claim 1, in which said resilient biasing means for resiliently biasing said latching member into said latching state and said resilient biasing means for resiliently biasing said blocking member into said blocking state comprise common resilient biasing means arranged to resiliently bias both of said latching member and said blocking member into the respective latching and blocking states.

19. A coupler as claimed in claim 18, wherein said actuating means for actuating said latching member and said actuating means for actuating said blocking member comprise a common actuator coupled to both the latching member and the blocking member, and wherein said at least one resilient biasing member is combined with said common actuator, and is arranged to urge said actuator into its extended state.

20. A coupler as claimed in claim 1, wherein said first and second pin-receiving recesses face in mutually perpendicular directions such that, when said coupler is in a horizontal orientation, said first recess faces downwards and said second pin-receiving recess faces horizontally.

21. A coupler as claimed in claim 1, wherein said second pin-receiving recess is hook-like in shape and function.

22. A coupler for coupling with an attachment, the coupler comprising a body having a first and second spaced-apart recesses for receiving respective pins of said attachment; a latching member movable into and out of a latching state in which it is capable of retaining the respective attachment pin in said first recess; actuating means for actuating said latching member into and out of said latching state; resilient biasing means for resiliently biasing said latching member into its latching state, wherein said latching member has a primary pin-engaging surface, a free end and a pin-retaining portion between the primary pin-engaging surface and the free end, wherein said coupler is operable in a normal mode in which said primary pin-engaging surface of said latching member is engaged with the respective attachment pin to hold said respective pin in a first position in said respective recess under the action of said actuating means for actuating said latching member, and upon failure of said actuating means for actuating said latching member the coupler is operable in a failure mode in which said pin-retaining portion of said latching member is engaged with said respective attachment pin to hold said respective pin in a second position, different from said first position, with respect to said respective recess, and wherein in said failure mode said coupler adopts an equilibrium state in which the biasing force of said resilient biasing means for resiliently biasing said latching member balances with the un-latching force caused by the weight of the attachment acting on said latching member through said respective pin in said pin-retaining portion to cause the latching member to hold said respective pin in said second position.

23. The coupler of claim 22, wherein said first recess has a pin-receiving surface and wherein, in said normal mode, said latching member holds said respective attachment pin against said pin-receiving surface and, in said failure mode, said latching member retains said respective pin in said pin-retaining portion such that said pin does not engage with said pin-receiving surface of said recess.

* * * * *